United States Patent
Ishikawa et al.

(10) Patent No.: US 7,898,628 B2
(45) Date of Patent: Mar. 1, 2011

(54) LIQUID CRYSTAL DISPLAY DEVICE

(75) Inventors: Yoshimitsu Ishikawa, Tokyo (JP); Tetsuyuki Kurata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 307 days.

(21) Appl. No.: 12/193,144

(22) Filed: Aug. 18, 2008

(65) Prior Publication Data

US 2009/0059134 A1 Mar. 5, 2009

(30) Foreign Application Priority Data

Aug. 29, 2007 (JP) .............................. 2007-222697
May 29, 2008 (JP) .............................. 2008-141360

(51) Int. Cl.
G02F 1/1335 (2006.01)
G02F 1/1343 (2006.01)

(52) U.S. Cl. ...................... 349/141; 349/117; 349/118; 349/119

(58) Field of Classification Search .................. None
See application file for complete search history.

(56) References Cited

U.S. PATENT DOCUMENTS

| 6,285,430 | B1 | 9/2001 | Saito | |
|---|---|---|---|---|
| 7,289,179 | B2 * | 10/2007 | Chang et al. | 349/141 |
| 7,365,815 | B2 * | 4/2008 | Hino et al. | 349/117 |
| 7,365,816 | B2 * | 4/2008 | Kawai et al. | 349/118 |
| 7,408,603 | B2 * | 8/2008 | Nakata et al. | 349/119 |
| 2007/0263145 | A1 | 11/2007 | Ishikawa et al. | |
| 2008/0013017 | A1 | 1/2008 | Ishikawa et al. | |

FOREIGN PATENT DOCUMENTS

| JP | 11-305217 | 11/1999 |
|---|---|---|
| JP | 2001-350022 | 12/2001 |
| JP | 2005-196119 | 7/2005 |
| JP | 2005-321528 | 11/2005 |

\* cited by examiner

*Primary Examiner*—David Nelms
*Assistant Examiner*—Mary A El Shammaa
(74) *Attorney, Agent, or Firm*—Oblon, Spivak, McClelland, Maier & Neustadt, L.L.P.

(57) ABSTRACT

A transverse electric field mode liquid crystal display device capable of improving the viewing angle characteristic in black display at an oblique viewing angle with a simple structure is provided. In the liquid crystal display device in accordance with one aspect of the present invention, (a) the product ($\Delta n \cdot d$) of the thickness d of the liquid crystal layer sandwiched between a pair of substrates and the refractive index anisotropy $\Delta n$ of the liquid crystal layer is within the range of 320 nm±20 nm, (b) each of the pair of polarizing plates is composed of a polarizer and transparent protective films sandwiching the polarizer therebetween, and the polarizing plate and the substrate are directly stuck together without any retardation film or optical compensation layer interposed therebetween, (c) the delay phase axis of the transparent protective film that protects the liquid crystal layer side is generally parallel with the absorption axis of the polarizer in each of the pair of polarizing plates, and (d) the in-plane retardation Re is equal to or less than 10 nm, and the retardation in thickness direction Rth is no less than 30 nm and no greater than 40 nm for the transparent protective film that protects the liquid crystal layer side in each of the pair of polarizing plates.

6 Claims, 5 Drawing Sheets

LIQUID CRYSTAL DISPLAY DEVICE

BACKGROUND OF THE INVENTION

1. Field of the Invention

The present invention relates to a transverse electric field mode liquid crystal display device. In particular, the present invention relates to improvements in the display of black color at an oblique viewing angle.

2. Description of the Related Art

In a liquid crystal display panel, the light transmittance is adjusted by applying voltage to the liquid crystal to control the alignment of the liquid crystal. Liquid crystal display modes are classified according to their types of the alignment changes of liquid crystal. Currently, major modes include TN (Twisted Nematic) mode, VA (Vertical Alignment) mode, and IPS (In-Plane Switching) mode.

In the TN mode, a longitudinal electric field is vertically applied to the substrate to make the liquid crystal molecules stand up or lie down with respect to the substrate surface in response to the applied voltage, in order to change the display state. In the VA mode, the display state is changed by causing the movements of the liquid crystal molecules with respect to the substrate surface in a similar manner.

In the IPS mode, a transverse electric field is horizontally applied to the substrate to make the movements of the liquid crystal molecules. The modes in which the movements of the liquid crystal molecules are made by the transverse electric field include FFS (Fringe Field Switching) mode, which is a kind of the IPS mode, in addition to the ordinary IPS mode. Since the movements of the liquid crystal molecules are made in the plane parallel to the substrate to change the ON and OFF states of the display state in the transverse electric field modes such as the IPS mode and FFS mode, these modes are characterized that they have a smaller retardation ($\Delta n \cdot d$) change, i.e., a smaller retardation caused by viewing angle change, of the liquid crystal layer, and a wider viewing angle. The retardation $\Delta n \cdot d$ is defined as the product of the refractive index anisotropy $\Delta n$ of liquid crystal molecules and a liquid crystal layer thickness d.

The viewing angle characteristic of the IPS mode is significantly better than that of the TN mode and VA mode. In general, an IPS mode liquid crystal display device without a viewing angle compensation film has a better viewing angle characteristic than that of TN mode or VA mode liquid crystal display device having an optimal viewing angle compensation film.

As described above, a good viewing characteristic can be achieved in a liquid crystal display device by minimizing the viewing angle dependence of the liquid crystal layer itself. However, there is another factor affecting the viewing angle characteristic besides the viewing angle dependence of the liquid crystal layer itself. It is the viewing angle dependence of a pair of orthogonally-arranged polarizing plates (crossed Nichol polarizing plates). Even in the pair of orthogonal polarizing plates alone, the orthogonality becomes out of order when viewed from an oblique angle. As a result, even without the liquid crystal layer, light leak occurs in black display at an oblique viewing angle, and thereby the resulting deterioration of the viewing angle characteristic becomes problematic.

The level of the light leak of the polarizing plate itself in black display is small in comparison with the light leak caused by the retardation change of the liquid crystal layer. Therefore, it has not been viewed as a problem in those modes that has larger light leak caused by the liquid crystal layer itself, such as TN mode. However, it has become problematic for IPS mode and FFS mode, which have an excellent viewing angle characteristic of the liquid crystal layer itself.

In order to solve the problem that light leak occurs due to the disordered orthogonality in the pair of polarizing plates in black display at an oblique viewing angle and thereby the viewing angle characteristic is deteriorated, some methods have been proposed in which an optical compensation layer having a birefringence characteristic is interposed between the liquid crystal layer and the polarizer (for example, Patent documents 1-4).

Japanese Unexamined Patent Application Publication No. 2001-350022 (Patent document 1) proposes a method of implementing viewing angle compensation for crossed Nichol polarizing plates, in which two biaxial optical compensation films having ½ wavelength retardation are interposed between the substrate and the polarizer in order to make the polarization state at oblique incidence equal to the polarization state at vertical incidence. Japanese Unexamined Patent Application Publication No. 11-305217 (Patent document 2) proposes a method in which one biaxial optical compensation film having ½ wavelength retardation is interposed between the substrate and polarizing plate. Japanese Unexamined Patent Application Publication No. 2005-321528 (Patent document 3) discloses a structure in which a first retardation region having a retardation layer, which is formed by stretching an alicyclic structure-containing polymer resin film, and a second retardation region are arranged between the substrate and the polarizing film (polarizer). Japanese Unexamined Patent Application Publication No. 2005-196119 (Patent document 4) proposes a structure in which an optical compensation layer having a compound containing discotic structure units, and a protective film are interposed between the substrate and the polarizing film (polarizer).

Furthermore, Patent document 4 also discloses a structure to improve the viewing angle characteristic without using the above-mentioned optical compensation layer having a compound containing discotic structure units, by providing a polarizer sandwiched between a pair of protective films.

SUMMARY OF THE INVENTION

As stated in Patent document 4, it can be seen that the placement of the optical compensation film having a compound containing discotic structure units is desired to further improve the viewing angle. However, it has increased the complexity of the structure and the cost owing to the arrangement of the newly introduced optical compensation film.

Needless to say, improvements in the viewing angle characteristic by a simple structure are most desired. The arrangement of the newly introduced optical compensation film is disadvantageous not only in terms of the cost but also in terms of downsizing in the thickness of a liquid crystal display device. In particular, in the case where the optical compensation is achieved by using several stretched films each composed of a birefringent polymer, it not only increases the thickness of the optical compensation sheet, but also raises a new problem that the peeling and warping occur between the films by the shrinking, caused by changes in temperature and humidity, of the adhesion layer that is used to stack the stretched films. In addition, it also poses another problem that the stretched birefringent polymer film is generally expensive, and thereby further increases the cost.

In one aspect, the present invention has been made in view of above-mentioned problems, and one of the objects of the present invention is to provide a transverse electric field mode liquid crystal display device capable of improving the viewing angle characteristic in black display at an oblique viewing angle by a simple structure.

In accordance with one aspect of the present invention, a liquid crystal display device includes: a pair of transparent substrates; a liquid crystal layer sandwiched between the pair of transparent substrates; a pair of polarizing plates placed opposite to each other through the pair of transparent substrates; and a pixel electrode and a common electrode placed apart from each other on one of the pair of transparent substrates; wherein the light transmissivity of the liquid crystal layer is controllable by the electric field generated between the pixel electrode and the common electrode. The liquid crystal display device further satisfies following items (a)-(d).

(a) The product $\Delta n \cdot d$ of the thickness d of the liquid crystal layer and the refractive index anisotropy $\Delta n$ of the liquid crystal layer is within the range of 320 nm±20 nm.

(b) Each of the pair of polarizing plates is composed of a polarizer and transparent protective films sandwiching the polarizer therebetween, and the polarizing plate and the transparent substrate are directly stuck together without any retardation film or optical compensation layer interposed therebetween.

(c) The delay phase axis of one of the transparent protective films that protects the liquid crystal layer side of the polarizing plate is generally parallel with the absorption axis of the polarizer in each of the pair of polarizing plates.

(d) The in-plane retardation Re, which is defined by the equation $Re=(nx-ny) \times df$, is equal to or less than 10 nm, and the retardation in thickness direction Rth, which is defined by the equation $Rth=\{(nx+ny)/2-nz\} \times df$, is no less than 30 nm and no greater than 40 nm, wherein nz is a refractive index in Z axis direction when the Z axis is the thickness direction, nx is a refractive index in X axis direction when the X axis is the direction of the largest refractive index in the plane orthogonal to the Z axis, and ny is a refractive index in Y axis direction when the Y axis is the direction orthogonal to both Z axis and X axis, for the transparent protective films that protects the liquid crystal layer side of the polarizer in each of the pair of polarizing plates.

In accordance with one aspect, the present invention has an advantageous effect that it can provides a transverse electric field mode liquid crystal display device having an excellent viewing angle characteristic in black display at an oblique viewing angle attained by a simple structure.

The above and other objects, features and advantages of the present invention will become more fully understood from the detailed description given hereinbelow and the accompanying drawings which are given by way of illustration only, and thus are not to be considered as limiting the present invention.

PREFERRED EMBODIMENT OF THE INVENTION

Embodiments to which the present invention is applied are explained hereinafter. Incidentally, it should be understood that other embodiments that are consistent with the gist of the present invention also fall within the scope of the present invention. Furthermore, the sizes and scales of components shown in the drawings are just for illustrative purpose, and other sizes and scales may be used in practical applications.

Figure 1:
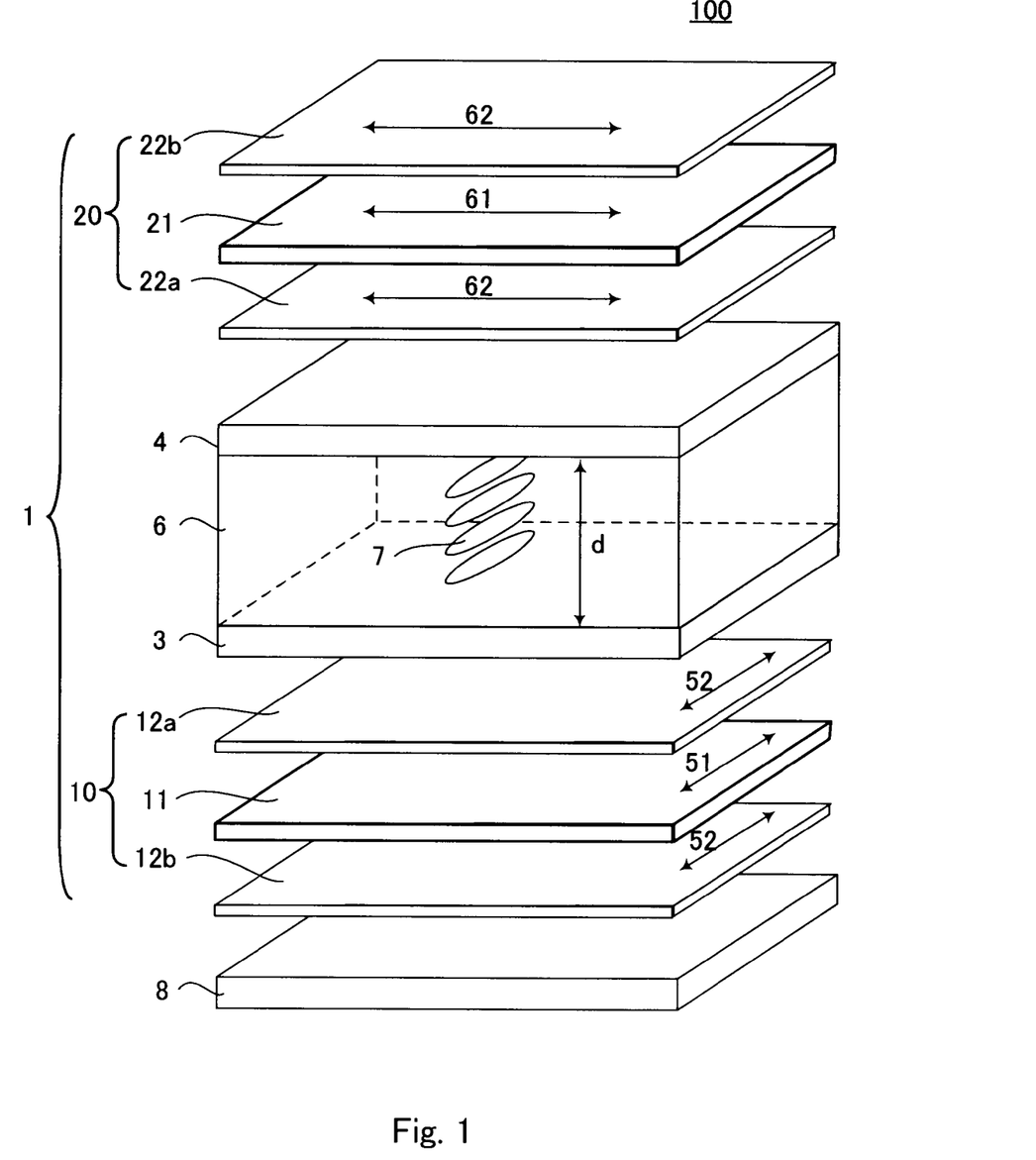
FIG. 1 is a schematic perspective view showing the structure of a liquid crystal display device in accordance with one embodiment of the present invention.

A liquid crystal display device in accordance with one embodiment of the present invention is a transverse electric field mode liquid crystal display device. In the following explanation, an IPS mode liquid crystal display device is explained as one example of the transverse electric field mode liquid crystal display devices. FIG. 1 is a schematic exploded perspective view showing the structure of a liquid crystal display device 100 in accordance with a first embodiment of the present invention. Furthermore, FIG. 2A is a schematic cross-section of the liquid crystal display device 100 in a state where voltage is not applied to the liquid crystal display device, and FIG. 2B is a schematic cross-section of the liquid crystal display device 100 in a state where voltage is applied to the liquid crystal display device.

Figure 2A:
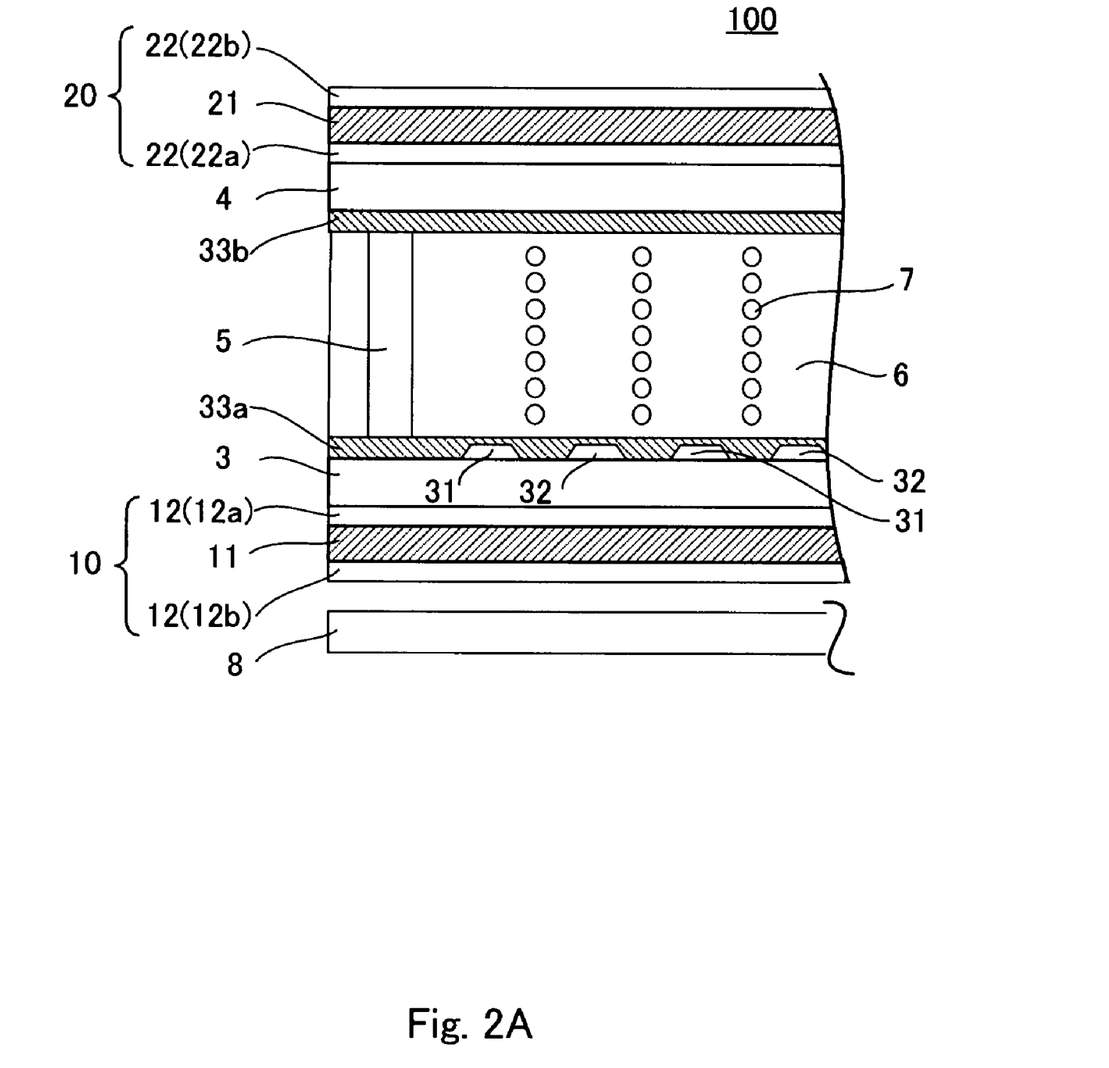
FIG. 2A is a schematic cross-section showing the liquid crystal display device in accordance with one embodiment of the present invention in a state in which voltage is not applied to the liquid crystal display device.
Figure 2B:
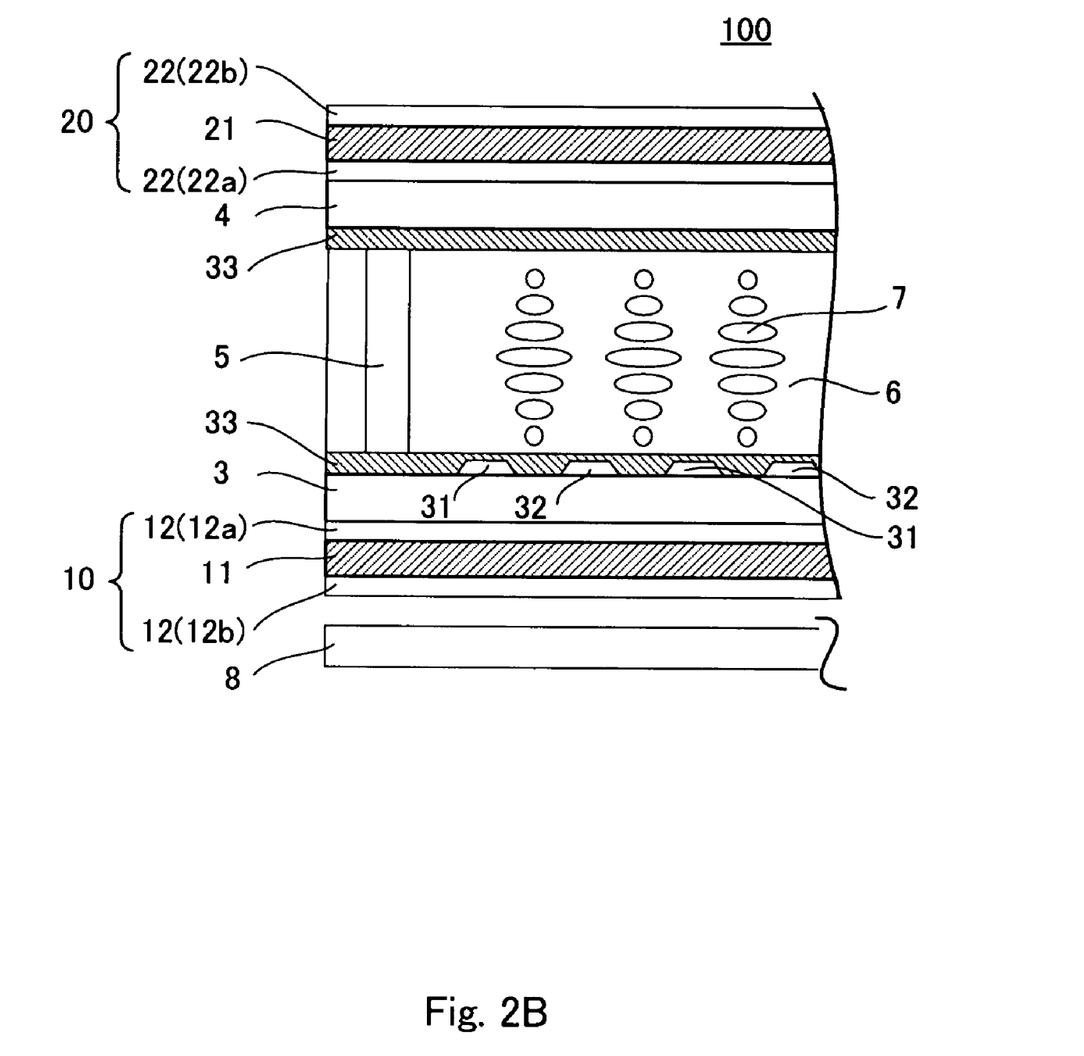
FIG. 2B is a schematic cross-section showing the liquid crystal display device in accordance with one embodiment of the present invention in a state in which voltage is applied to the liquid crystal display device.

As shown in FIGS. 1 and 2, the liquid crystal display device 100 includes an array substrate 3 and an opposed substrate 4. Furthermore, the pair of substrates are stuck together with a seal pattern formed of sealing material 5 interposed therebetween, and the space formed between the substrates is filled with a liquid crystal layer 6. The liquid crystal molecules 7 constituting the liquid crystal layer 6 are schematically enlarged in the figures for the sake of illustration.

The array substrate 3 includes a transparent insulating substrate composed of a substrate made of glass, polycarbonate, acrylic resin, or the like, and switching elements (not shown), an insulating film (not shown), comb-shaped common electrodes 31, comb-shaped pixel electrodes 32, and the like, all of which are formed on the transparent insulating substrate. The pixel electrode 32 is formed in each pixel region on the liquid crystal layer 6 side of the array substrate 3, and a selected video signal is supplied to the pixel electrode 32 through a video signal line (not shown). A common signal is supplied to the common electrode 31, which is placed apart from the pixel electrode 32, through a common signal line (not shown). Furthermore, a first alignment layer 33a and the like are formed above these electrodes and lines. The first alignment layer 33a serves to orientate the liquid crystal molecules 7, and the comb-shaped electrodes composed of the common electrode 31 and the opposed pixel electrode 32 serve to distort and deform the liquid crystal layer 6 by applying voltage parallel to the substrate. Then, the light transmissivity is controlled depending on the extent of the distortion and deformation of the liquid crystal layer 6. The switching element (not shown) is composed of TFT (Thin Film Transistor) or the like, and serves to supply voltage to the pixel electrode 32 formed above the insulating film. A first polarizing plate 10 is placed on the main outer surface of the array substrate 3. Incidentally, although the IPS mode, in which both common electrode 31 and pixel electrode 32 are comb-shaped electrodes, is explained in this embodiment, the present invention is applicable to FFS mode having an electrode structure in which one of the common electrode 31 and pixel electrode 32 is a comb-shaped electrode and the other electrode is arranged throughout the entire surface in a lower layer with an insulating film interposed therebetween.

The first polarizing plate 10 has a structure in which a first polarizer 11 is sandwiched between two first transparent protective films 12 (12a, 12b). A polarizing plate is, in general, formed by stacking transparent protective film(s) on a polarizer. The polarizer is an optical element to transmit one component (i.e., component having an oscillation direction parallel to the transmission axis of the polarizer) of two mutually-orthogonal polarization components of the incident light, and to absorb the other component (i.e., component having an oscillation direction parallel to the absorption axis of the polarizer). In the following explanation, one of the transparent protective films 12 that is placed on the liquid crystal layer 6 side is called "liquid crystal side first transparent protective film 12a", and the other film that is placed on the backlight 8 side is called "backlight side first transparent protective film 12b". The detail of the structure of the transparent protective films 12 is explained later.

The opposed substrate 4 includes a transparent insulating substrate, a shield layer (black matrix layer) (not shown), color filter layers acting as color material layers (not shown) a second alignment layer 33b, and the like. The transparent insulating substrate may be composed of a transparent substrate such as a glass substrate or a quartz substrate. A second polarizing plate 20 is placed on the main outer surface of the opposed substrate 4.

The second polarizing plate 20 has a structure in which a second polarizer 21 is sandwiched between two second transparent protective films 22 (22a, 22b). In the following explanation, one of the transparent protective films 22 that is placed on the liquid crystal layer 6 side is called "liquid crystal side second transparent film 22a", and the other film that is placed on the viewable side is called "viewable side second transparent film 22b". The first polarizer 11 and second polarizer 21 are placed such that their transmission axes are orthogonal to each other.

The liquid crystal display device 100 includes, in addition to the above-mentioned components, a control substrate (not shown) to generate driving signals, a FFC (Flexible Flat Cable) (not shown) electrically connected to the control substrate, a backlight 8 as the light source, and the like. The backlight 8 is placed on the non-viewable side (back side) of the liquid crystal display panel 1, and irradiates light to the viewable side through the liquid crystal display panel 1. For example, a typical backlight structure having a light source, an optical waveguide plate, a reflection sheet, a diffusing sheet, a prism sheet, reflective polarizing sheet, and the like may be used for the backlight 8.

An example of the operation of the liquid crystal display device 100 to display desired images is explained hereinafter. When an electrical signal is inputted from the control substrate, driving voltage is applied between the common electrode 31 and pixel electrode 32, and the directions of the liquid crystal molecules 7 are changed in accordance with the driving voltage. For example, in the case of p-type liquid crystal, since the liquid crystal molecules 7 try to turn to the direction of the electric field, distortion and deformation are induced in the liquid crystal layer. Then, the light transmissivity is controlled depending on the extent of the distortion and deformation. The light irradiated from the backlight 8 is externally transmitted or shielded through the array substrate 3, liquid crystal molecules 7, and opposed substrate 4, and thereby desired images or the like are displayed on the liquid crystal display device 100.

After the cumulative diligent studies by the inventors to improve the viewing angle characteristic with a simple structure, we have found out that the above-mentioned objects can be achieved by satisfying the following items (a)-(d) in a liquid crystal display device 100 having the above-described structure.

(a) The retardation of the liquid crystal layer 6 satisfies the following equation <1>.

$$300 \text{ nm} \leq \Delta n \cdot d \leq 340 \text{ nm} \qquad <1>$$

In the equation, d is the thickness of the liquid crystal layer 6 and $\Delta n$ is the refractive index anisotropy of the liquid crystal molecules 7. That is, the retardation of the liquid crystal layer 6 is adjusted within the range of 320 nm±20 nm. We have also found out that light leak in black display at an oblique viewing angle can be effectively suppressed by adjusting the retardation within this range in combination with other conditions (b)-(d) (which are explained later). Incidentally, in a transverse electric field mode liquid crystal display device 100, the retardation of the liquid crystal layer 6 is traditionally set to the order of one half wavelength ($\lambda/2$) of green light (540-560 nm), which has a high luminosity, in order to minimize the color tracking (i.e., voltage dependence of chromaticity). That is, the retardation of the liquid crystal layer 6 is traditionally set to 270-280 nm.

(b) The polarizing plates 10 and 20 are composed of polarizers 11 and 21 and transparent protective films 12 and 22 sandwiching the polarizers 11 and 21 respectively. The first polarizing plate 10 and the array substrate 3 are directly stuck together without any retardation film or optical compensation layer interposed therebetween. Similarly, the second polarizing plate 20 and the opposed substrate 4 are directly stuck together without any retardation film or optical compensation layer interposed therebetween. In this manner, the downsizing in the thickness and the reduction in the cost of the liquid crystal display device 100 can be achieved with the simple structure.

(c) The delay phase axes 52 and 62 of the transparent protective films 12a and 22a, which are located on the liquid crystal layer 6 sides and constitute parts of the first and second polarizing plates 10 and 20 respectively, are generally parallel with the absorption axes 51 and 61 of the first and second polarizers 11 and 21, which also constitute parts of the first and second polarizing plates 10 and 20 respectively.

In this embodiment, the absorption axis 51 of the first polarizer 11 constituting a part of the first polarizing plate 10 is generally parallel with the delay phase axes 52 of the two transparent protective films 12 (12a, 12b) sandwiching the first polarizer 11 therebetween. Similarly, the absorption axis 61 of the second polarizer 21 constituting a part of the second polarizing plate 20 is generally parallel with the delay phase axes 62 of the two transparent protective films 22 (22a, 22b) sandwiching the second polarizer 21 therebetween.

(d) The in-plane retardation Re and the retardation in thickness direction Rth of each of the liquid crystal side first transparent protective film 12a and liquid crystal side second transparent film 22a, which protect their respective surfaces of the first and second polarizers 11 and 21 placed on the liquid crystal layer 6 sides, are adjusted to the ranges described below.

The in-plane retardation Re of each of the liquid crystal side first transparent protective film 12a and liquid crystal side second transparent film 22a is adjusted so as to satisfy the equation <3> when the in-plane retardation Re is defined by the following equation <2>.

$$Re=(nx-ny)\times df \qquad <2>$$

In the equation, nx is a refractive index in the direction of the largest refractive index (X axis) in the plane orthogonal to Z axis when the Z axis is the thickness direction of the first (second) transparent protective films 12 (22), and ny is a refractive index in the direction (Y axis) orthogonal to both Z axis and X axis. Furthermore, df is the thickness of the liquid crystal side first transparent protective film 12a and liquid crystal side second transparent film 22a.

$$Re \leq 10 \text{ nm} \qquad <3>$$

The only necessary condition for the in-plane retardation Re of each of the liquid crystal side first transparent protective film 12a and liquid crystal side second transparent film 22a is that it should be no greater than 10 nm, and it can be zero.

The retardation in thickness direction Rth of each of the liquid crystal side first transparent protective film 12a and liquid crystal side second transparent film 22a is adjusted so as to satisfy the equation <5> when the retardation in thickness direction Rth is defined by the following equation <4>. In the equation, nz is a refractive index in the Z axis (the thickness direction of the first and second transparent protective films 12 and 22).

$$Rth=\{(nx+ny)/2-nz\}\times df \qquad <4>$$

$$30 \text{ nm} \leq Rth \leq 40 \text{ nm} \qquad <5>$$

With regard to the backlight side first transparent protective film 12b and viewable side second transparent film 22b, they do not need to satisfy the above-mentioned equations <3> and <5>, and the only necessary functions for them are to protect the polarizers 11 and 21.

Incidentally, typical material for the first and second transparent protective films 12 and 22 protecting the first and second polarizers 11 and 21 includes a triacetylcellulose (TAC) film. The TAC has an in-plane retardation Re, though it is very small. This embodiment is configured such that the directions of the delay phase axes 52 and 62 of the in-plane retardations Re of the first and second transparent protective films 12 and 22 are generally parallel with the directions of the absorption axes of the first and second polarizers 11 and 21. Furthermore, there was a retardation in the direction of the thickness df, and the retardation Rth in the direction of the thickness df was in the range of 50 nm-60 nm.

The first polarizing plate 10 was arranged such that the absorption axis 51 of the first polarizer 11 is generally parallel with the rubbing direction of the first alignment layer 33a, and the second polarizing plate 20, which was placed on the viewable side, is arranged such that the absorption axis 61 of the second polarizer 21 is generally orthogonal to the rubbing direction of the second alignment layer 33b. The rubbing process is carried out such that the rubbing direction has an angle θ1 with respect to the long-side direction of the comb-shaped electrodes. Incidentally, the terms "parallel" and "orthogonal", respectively, in the explanation mean not only exactly parallel and exactly orthogonal states, but also parallel and orthogonal states having errors of no more than ±5 degree. In the explanation, such states are described as generally parallel and generally orthogonal respectively.

The liquid crystal molecules 7 are in a uniaxial orientation state along the rubbing direction in the off-state where voltage is not applied. In the on-state where voltage is applied, distortion and deformation are induced in the liquid crystal layer 6 by the transverse electric field applied in the direction orthogonal to the long-side direction of the comb-shaped electrodes composed of the common electrode 31 and the opposed pixel electrode 32. As a result, light is partially or entirely transmitted through the liquid crystal layer 6 by the resulting birefringence effect occurring in the liquid crystal layer 6. Then, the light transmissivity can be controlled by changing the extent of the distortion of the liquid crystal molecules 7.

Incidentally, with regard to the rubbing direction, the same effect is achieved even if the absorption axis 51 of the first polarizer 11 is arranged so as to be generally orthogonal to the rubbing direction of the liquid crystal layer 6, and the absorption axis 61 of the second polarizer 21 is arranged so as to be generally parallel with the rubbing direction of the liquid crystal layer 6.

Furthermore, the rubbing direction may be established in a specific direction in accordance with a desired viewing angle characteristic for the direction of the comb-shaped electrodes.

In accordance with this embodiment of the present invention, the viewing angle characteristic in transverse electric field mode for IPS mode, FFS mode, and the like can be improved by optimizing the physical properties of the first and second transparent protective films 12 and 22 used to protect the first and second polarizers 11 and 21, which in turn constitute parts of the first and second polarizing plates 10 and 20 respectively, and the liquid crystal layer 6. Then, only another requirement for the improvement in the viewing angle characteristic is to directly stick the first polarizing plate 10 to array substrate 3, and the second polarizing plate 20 to opposed substrate 4 without any newly-introduced retardation film or optical compensation layer interposed therebetween.

More specifically, light leak in black display at an oblique viewing angle originating in the polarizing plates can be reduced without adding any newly-introduced optical compensation layer interposed therebetween by adjusting the retardation value of the liquid crystal layer 6 and the values for the retardations in thickness direction Rth and in-plane retardations Re of the liquid crystal side first transparent protective film 12a and liquid crystal side second transparent film 22a, which are placed on the liquid crystal layer 6 sides, of the first and second polarizing plates 10 and 20. In this manner, a liquid crystal display device 100 having a simple structure can be provided.

In addition, since it does not require any newly-introduced optical compensation layer, the downsizing in the thickness and reduction in the cost of the liquid crystal display device 100 can be achieved.

Furthermore, it also does not need to stack and bond stretched films, that form the optical compensation layer, with each other, and thereby does not raise the problem of the peeling and warping between the films by the shrinking or the like of the adhesion layer caused by changes in temperature and humidity.

Furthermore, the light transmissivity can be also improved by adjusting the retardation of the liquid crystal layer 6 within the range of above-mentioned equation <1>, in comparison with the light transmissivity in the traditional setting of 270-280 nm.

Incidentally, although the explanations are made with a liquid crystal display device adopting the IPS mode in this embodiment, the present invention is also applicable to liquid crystal display devices adopting other transverse electric field modes such as FFS mode.

Example

Next, the present invention is explained in more specific manner with a more example hereinafter. However, the scope of the present invention is not limited to the example explained below. A liquid crystal display device 100 in accordance with this example, by way of illustration, adopts IPS mode as shown in FIG. 2, and uses p-type liquid crystal. A liquid crystal display panel 1 was manufactured in the following manner.

A liquid crystal layer having following characteristics was used as the liquid crystal layer 6.
refractive index anisotropy: $\Delta n=0.089$ (550 nm, 20° C.)
dielectric constant anisotropy: $\Delta\epsilon=+7.8$
thickness of liquid crystal layer 6: $d=3.6$ μm
retardation of liquid crystal layer 6: $\Delta n \cdot d=320$ nm The in-plane retardations Re of the transparent protective films 12 (12a, 12b), 22 (22a, 22b) were equal to or less than 10 nm. Furthermore, the directions of the delay phase axes 52 and 62 of the in-plane retardations Re of the first and second transparent protective films 12 and 22 were arranged so as to be generally parallel with the directions of the absorption axes of the first and second polarizers 11 and 21 placed in their respective sides. As described above, films of the same material were used as the liquid crystal side first transparent protective film 12a and liquid crystal side second transparent film 22a for the first and second transparent protective films 12 and 22.

The thickness d of the liquid crystal layer 6 is adjusted by using appropriate spacers. Spherical spaces, pillar-shaped spacers, or the likes may be used as the spacers. A polyimide film, a polyamic acid film, or the like, which are subjected to a rubbing alignment process using a cloth such as rayon, may be used as the alignment layers 33 (33a, 33b). The rubbing was carried out at an angle in the order of 15° with respect to the long-side direction of the comb-shaped electrodes. For the second alignment layer 33b placed on the opposed substrate 4, the rubbing was carried out in parallel with the rubbing direction of the first alignment layer 33a placed on the array substrate 3.

Figure 3:
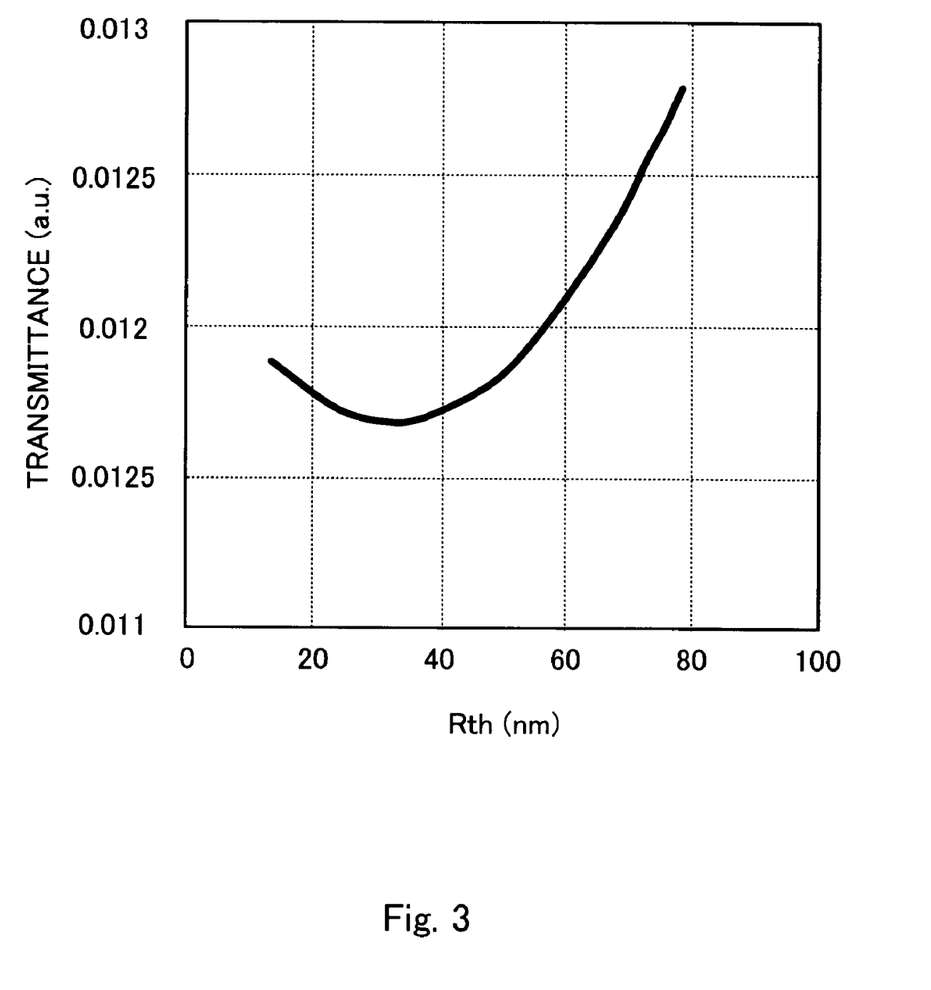
FIG. 3 is a graph in which black brightness is plotted against the retardation in thickness direction Rth of the protective film in accordance with one embodiment of the present invention.

FIG. 3 shows results of the calculated black brightness at an oblique viewing angle (azimuth angle: 60°, polar angle: 70°) against the retardations in thickness direction Rth of the liquid crystal side first transparent protective film 12a and liquid crystal side second transparent film 22a. The polar angle is an incline angle measured from the normal to the display surface, and the azimuth angle is an angle in the display surface. It can be seen that the values of the black brightness can be reduced in comparison with the comparative example (which is explained later) by setting the retardation of the liquid crystal layer 6 to 320 nm. Furthermore, it can be also seen from the same figure that the preferable values for the retardations in thickness direction Rth of the liquid crystal side first transparent protective film 12a and liquid crystal side second transparent film 22a are 20-50 nm when the retardation of the liquid crystal layer 6 is set to 320 nm. Furthermore, the optimal range is 30-40 nm.

Comparative Example

Next, a comparative example is explained hereinafter. A liquid crystal layer having following characteristics was used as the liquid crystal layer 6.
refractive index anisotropy: $\Delta n=0.089$ (550 nm, 20° C.)
dielectric constant anisotropy: $\Delta\epsilon=+7.8$
thickness of liquid crystal layer 6: $d=3.14$ μm
retardation of liquid crystal layer 6: $\Delta n \cdot d=280$ nm The in-plane retardations Re of the transparent protective films 12 (12a, 12b), 22 (22a, 22b) were equal to or less than 10 nm. Other components were the same as those of the above-described example. As described above, films of the same material were used as the liquid crystal side first transparent protective film 12a and liquid crystal side second transparent film 22a for the first and second transparent protective films 12 and 22.

Figure 4:
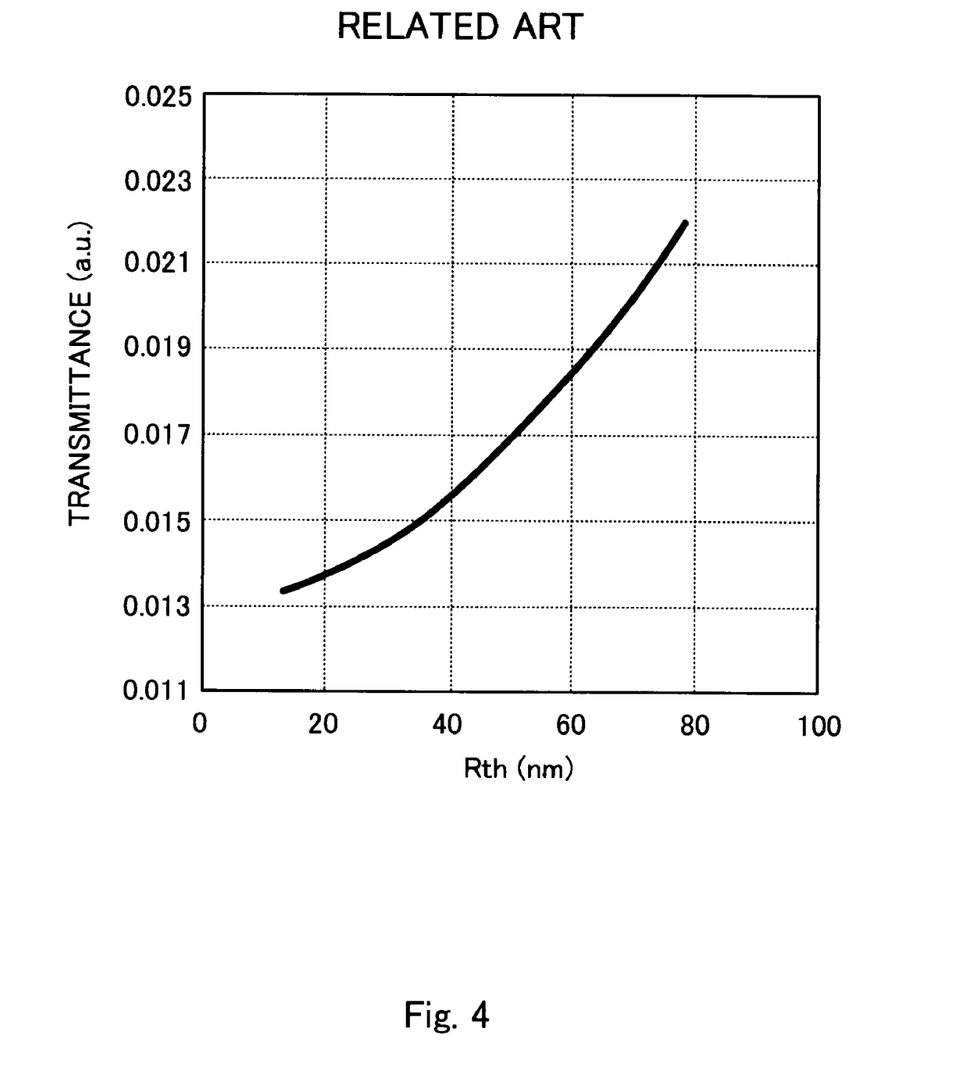
FIG. 4 is a graph in which black brightness is plotted against the retardation in thickness direction Rth of the protective film in accordance with a comparative example.

FIG. 4 shows results of the calculated black brightness at an oblique viewing angle (azimuth angle: 60°, polar angle: 70°) against the retardations in thickness direction Rth of the liquid crystal side first transparent protective film 12a and liquid crystal side second transparent film 22a. As can be seen from FIG. 4, the smaller the retardations in thickness direction Rth of the liquid crystal side first transparent protective film 12a and liquid crystal side second transparent film 22a, the smaller the leak of the black brightness becomes. Therefore, when the retardation of the liquid crystal layer 6 is designed to be 280 nm, the better characteristics would be obtained by eliminating the liquid crystal side first transparent protective film 12a and liquid crystal side second transparent film 22a. However, the polarizing plates 10 and 20, in practice, cannot be manufactured without the first and second transparent protective films 12 and 22. Accordingly, in order to reduce the light leak in black display when viewed from an oblique angle, it requires a newly-introduced retardation film or an optical compensation layer film.

Although the rubbing direction of the second alignment layer 33b of the opposed substrate 4 was arranged so as to be parallel with that of the first alignment layer 33a of the array substrate 3 in the above-described example and the comparative example, the same results were obtained even when they were arranged in anti-parallel with each other.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device comprising:
   a pair of transparent substrates;
   a liquid crystal layer sandwiched between the pair of transparent substrates;
   a pair of polarizing plates placed opposite to each other through the pair of transparent substrates; and
   a pixel electrode and a common electrode placed apart from each other on one of the pair of transparent substrates;
   wherein the light transmissivity of the liquid crystal layer is controlled by the electric field generated between the pixel electrode and the common electrode; and
   wherein the liquid crystal display device further satisfies following items (a)-(d)
   (a) the product ($\Delta n \cdot d$) of the thickness d of the liquid crystal layer and the refractive index anisotropy $\Delta n$ of the liquid crystal layer is within the range of 320 nm±20 nm;
   (b) each of the pair of polarizing plates is composed of a polarizer and transparent protective films sandwiching the polarizer therebetween, and the polarizing plate and the transparent substrate are directly stuck together without any retardation film or optical compensation layer interposed therebetween;

(c) the delay phase axis of one of the transparent protective films that protects the liquid crystal layer side of the polarizing plate is generally parallel with the absorption axis of the polarizer in each of the pair of polarizing plates; and (d) the in-plane retardation Re, which is defined by the equation Re=(nx−ny)×df, is equal to or less than 10 nm, and the retardation in thickness direction Rth, which is defined by the equation Rth={(nx+ny)/2−nz}×df, is no less than 30 nm and no greater than 40 nm, wherein nz is a refractive index in Z axis direction when the Z axis is the thickness direction, nx is a refractive index in X axis direction when the X axis is the direction of the largest refractive index in the plane orthogonal to the Z axis, and ny is a refractive index in Y axis direction when the Y axis is the direction orthogonal to both Z axis and X axis, for the transparent protective films that protects the liquid crystal layer side of the polarizer in each of the pair of polarizing plates.

2. The liquid crystal display device according to claim 1, wherein the liquid crystal layer includes, as the main component, liquid crystal molecules capable of being distorted and deformed by the electric field generated between the pixel electrode and the common electrode.

3. The liquid crystal display device according to claim 1, wherein:

alignment layers to control the alignment of the liquid crystal molecules of the liquid crystal layer are placed on the surfaces, that contact with the liquid crystal layer, of the pair of transparent substrates; and the absorption axis of the polarizer of one of the pair of polarizing plates is arranged so as to be generally parallel with a rubbing direction of the alignment layer that is placed on the side of this polarizer, and the absorption axis of the polarizer of the other of the pair of polarizing plates is arranged so as to be generally orthogonal to the rubbing direction of the alignment layer.

4. The liquid crystal display device according to claim 2, wherein:

alignment layers to control the alignment of the liquid crystal molecules of the liquid crystal layer are placed on the surfaces, that contact with the liquid crystal layer, of the pair of transparent substrates; and the absorption axis of the polarizer of one of the pair of polarizing plates is arranged so as to be generally parallel with a rubbing direction of the alignment layer that is placed on the side of this polarizer, and the absorption axis of the polarizer of the other of the pair of polarizing plates is arranged so as to be generally orthogonal to the rubbing direction of the alignment layer.

5. The liquid crystal display device according to claim 1, wherein:

alignment layers to control the alignment of the liquid crystal molecules of the liquid crystal layer are placed on the surfaces, that contact with the liquid crystal layer, of the pair of transparent substrates; and the absorption axis of the polarizer of one of the pair of polarizing plates is arranged so as to be generally orthogonal to a rubbing direction of the alignment layer that is placed on the side of this polarizer, and the absorption axis of the polarizer of the other of the pair of polarizing plates is arranged so as to be generally parallel with the rubbing direction of the alignment layer.

6. The liquid crystal display device according to claim 2, wherein:

alignment layers to control the alignment of the liquid crystal molecules of the liquid crystal layer are placed on the surfaces, that contact with the liquid crystal layer, of the pair of transparent substrates; and the absorption axis of the polarizer of one of the pair of polarizing plates is arranged so as to be generally orthogonal to a rubbing direction of the alignment layer that is placed on the side of this polarizer, and the absorption axis of the polarizer of the other of the pair of polarizing plates is arranged so as to be generally parallel with the rubbing direction of the alignment layer.

* * * * *